Aug. 29, 1950 R. M. PAGE 2,520,166
RADIO ECHO DEVICE FOR VELOCITY DETERMINATION
Filed Oct. 14, 1943 2 Sheets-Sheet 2
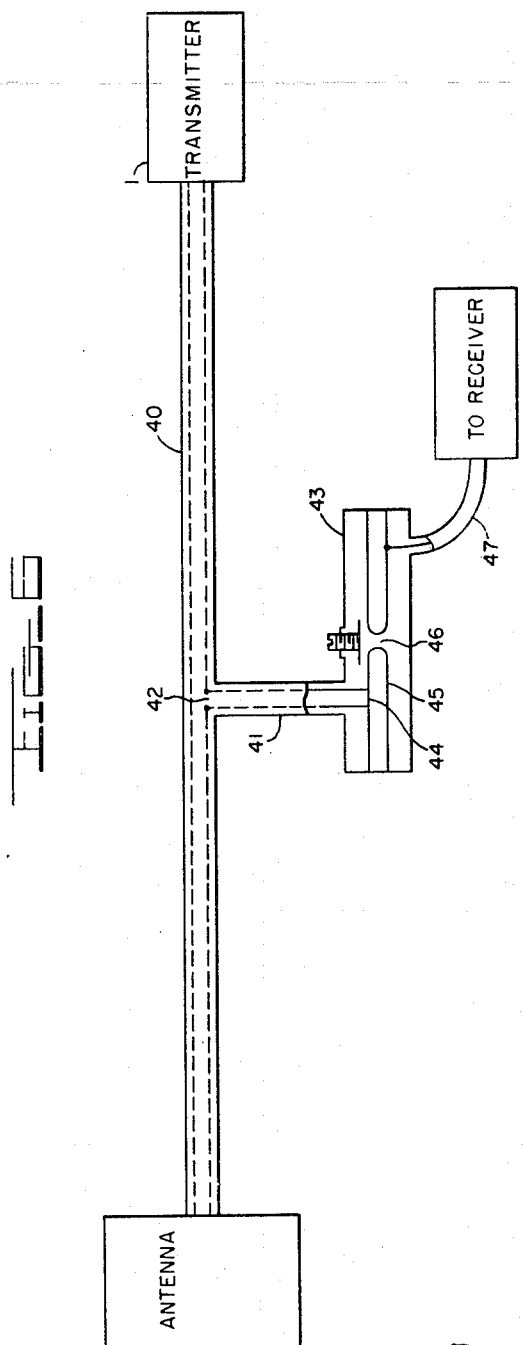
INVENTOR
ROBERT M. PAGE
BY
ATTORNEYS Patented Aug. 29, 1950

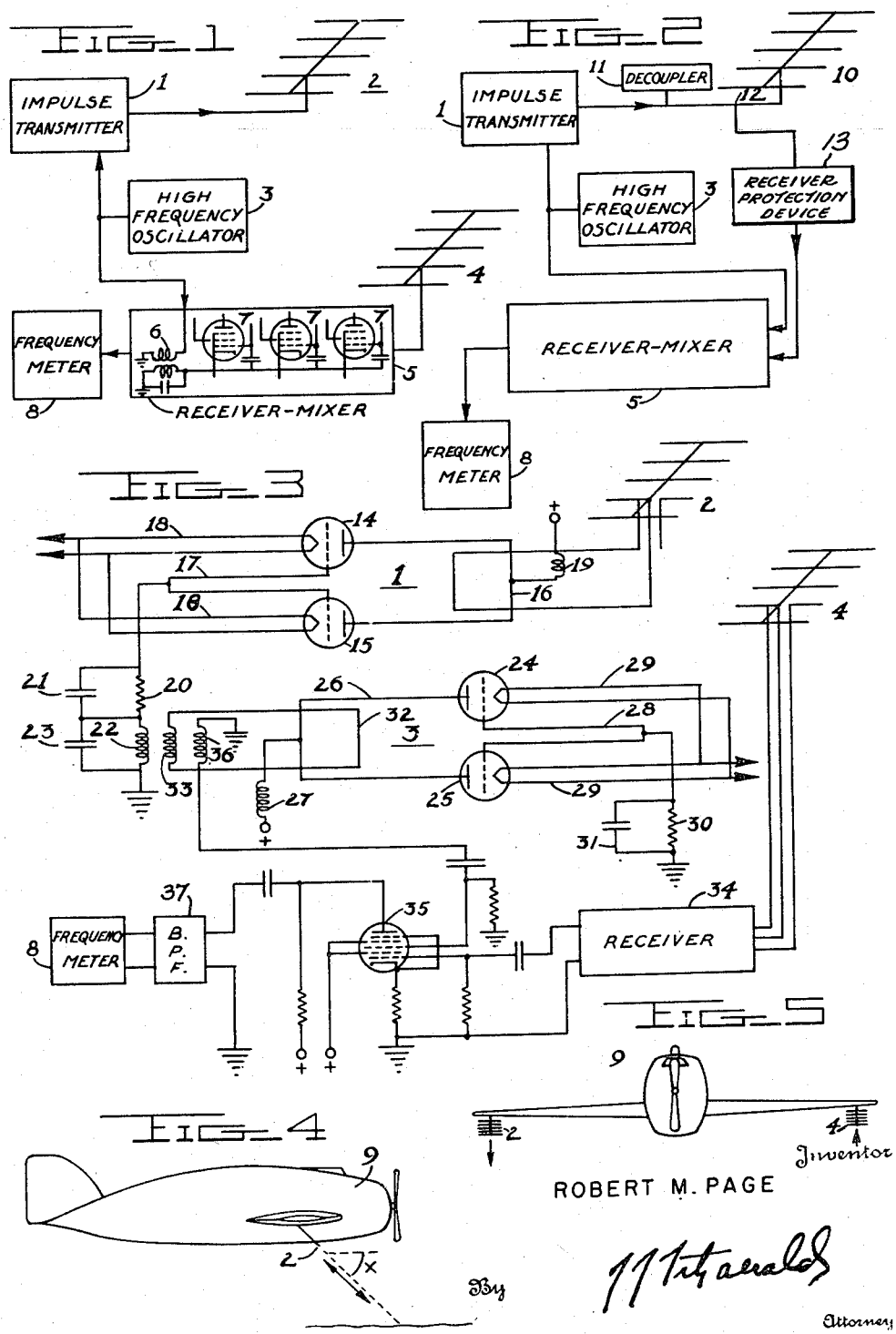

2,520,166

UNITED STATES PATENT OFFICE 2,520,166

RADIO ECHO DEVICE FOR VELOCITY DETERMINATION

Robert M. Page, Washington, D. C.

Application October 14, 1943, Serial No. 506,187

4 Claims. (Cl. 343—8)

(Granted under the act of March 3, 1883, as amended April 30, 1928; 370 O. G. 757)

This invention relates to the determination of velocities by means of the Doppler effect, and is particularly directed to the determination of the ground speed of aircraft.

In previously known systems of this type a radio frequency wave is continuously transmitted from the installation and the returned wave which may be reflected or reradiated from the ground or from another object is received and compared therewith. Such installations require complete shielding between the transmitter and receiver systems to avoid saturation of the latter by the direct wave. This condition is so difficult to establish and maintain in practice that complex measures have been proposed to overcome the same, such as the provision of frequency multiplying ground stations for returning a harmonic of the wave to a receiver which is simultaneously provided with the same harmonic directly from the transmitter.

Accordingly, it is an object of the present invention to provide a velocity indicator which does not require shielding between the transmitter and receiver, and which eliminates the requirement of fixed installations for points of reference.

The system of the present invention includes a continuously running oscillator, an intermittently operative impulse transmitter, and a receiver-mixer device for comparing the returned wave with a direct signal from the oscillator. Inasmuch as the transmitter and receiver are not simultaneously operative, shielding requirements between the respective antennas are not stringent, and in many cases it is contemplated to employ the same antenna with decoupling and receiver protective devices now known in the art.

In the preferable embodiment of the invention, the impulse transmitter operates at a very high frequency, such as a number of thousands of megacycles, pulsing at a low frequency. The transmitter is modulated by the continuously running oscillator which may operate at a lower frequency than the transmitter, such as one hundred megacycles. Thus a radiated impulse is provided with a frequency characteristic of the continuously running oscillator. The Doppler effect causes the same fractional shift in the modulating frequency of the carrier as in the carrier itself, and thus the modulating frequency of the returned wave is compared with that of the continuously running oscillator to ascertain the velocity of the body.

It will be understood, naturally, that the principles of the invention are applicable to employment in fixed installations to ascertain the relative velocity of a moving aircraft or other object.

The invention will be further described in detail in connection with the exemplary embodiments shown in the drawings, in which:

Fig. 1 shows in block diagram an installation embodying the invention.

Fig. 2 shows a velocity determining system similar to that of Fig. 1 but employing a single antenna.

Fig. 3 shows the circuit diagram of a system generally similar to that of Fig. 1, and Figs. 4 and 5 show suitable antenna installation on an aircraft of a system such as that of Fig. 3.

Fig. 6 shows in simplified schematic form one suitable duplexing system permitting transmission and reception with a single antenna.

As shown in Fig. 1, an impulse transmitter 1 is provided for radiating high frequency wave groups from directional antenna 2. The impulse duration will preferably be of the order of a few microseconds or less. The antenna shown is a Yagi including a reflector and three directors. The transmitter 1, when operating, is modulated by the high frequency oscillator 3, so as to emit a modulated impulse.

The returned wave is received by antenna 4 and fed to the receiver-mixer 5. The receiver is designed to have a short recovery time after saturation by the direct wave from the transmitter, and accordingly is operative to respond to the returned wave. The continuously running oscillator is also connected to the receiver and the frequency is mixed with the returned frequency to determine the amount of shift, and thereby the velocity of the aircraft.

As shown in Fig. 1, the signal from oscillator 3 is coupled through transformer 6 to the control grids of amplifier tubes 7 of the receiver, and is mixed with the modulated R. F. in the receiver. Consequently the Doppler difference frequency is produced at the detector, and may be fed to the frequency meter 8. The latter is directly calibrated in velocity. The system will incorporate means for eliminating undesired frequencies from the signal fed to the frequency meter, and normally the pulse frequency will be selected either above or below the range of response of the instrument.

As shown in Fig. 1, antennas 2 and 4 are suitably positioned for a ground installation to ascertain the velocity of approach of an aircraft. In case it is desired to install the system on an aircraft 9, the antennas may be mounted as shown in Figs. 4 and 5. In this case the radiation is directed forwardly and downwardly at a known angle.

As is well known, the relation between the speed of the aircraft and the frequency shift is as follows:

$$\frac{df}{f} = \frac{2V \cos X}{C}$$

Where $df$ is the beat frequency indicated by the frequency meter, $f$ is the frequency of the continuously running oscillator, V the speed of the aircraft, C the velocity of propagation, and X is the angle between the direction of flight and the direction of transmission as indicated in Fig. 4.

In Fig. 2 is shown a system similar to that of Fig. 1 with the exception that provision is made for the employment of a single antenna 10 functioning for both transmitting and receiving. The duplexing system which switches the antenna alternately to the transmitter and receiver includes decoupler 11 operative to present a high impedance at the receiver line tap 12 looking toward transmitter 1 when the latter is blocked. When high power levels are present in the line the decoupler automatically shifts impedance so that transmission is not disturbed.

With the transmitter quiescent, the lines are matched through from antenna 10 to receiver 5. Under establishment of high power levels, however, the receiver protective device 13 shifts impedance and by the resultant mismatch protects the receiver 5 from damage by high power levels. Upon termination of the transmitter impulse, the receiver is available for reception of the returned wave.

The advantages of this system in simplicity of apparatus over that of Fig. 1 are immediately apparent, particularly for aircraft installation. As above pointed out, such operation is inherently impossible with previously known velocity indicators. Further details of the operation of this type of duplexing are given in application Serial No. 326,640, filed March 29, 1940, for Impedance Control Coupling and Decoupling System and in applications Serial No. 452,534, filed July 27, 1942, for Antenna Duplexing System and Serial No. 474,663, filed February 4, 1943, for Concentric Line Construction.

For convenient reference one of the above forms of antenna duplexing as disclosed in the above-identified application Serial No. 452,534, is shown in Fig. 6, to which reference is now made. As here shown the impulse transmitter 1 is coupled to the antenna through a non-resonant concentric transmission line 40 of any suitable length. The inner and outer conductors of one end of a suitable quarter wave stub line 41 are connected to the corresponding conductors of the main feed line 40 at any suitable point 42 an odd multiple of quarter wave lengths from the transmitter 1. The other end of the stub line 41 is connected to the corresponding conductors of a resonant tank circuit 43 at a point 44 intermediate the ends thereof. Resonant tank 43 is preferably somewhat longer than one quarter wavelength and has each end shorted by a metal plate. The inner conductor 45 is interrupted at its mid-point to form a spark gap 46. The receiver is connected through coaxial line 47 to the tank 43.

Briefly, the operation of this device is as follows: When gap 46 fires under the influence of a strong impulse from transmitter 1, tank circuit 43 and stub line 41 act to effectively decouple the receiver from the line 40 at point 42 and thus prevent damage to the receiver due to the strong transmitter impulses. In the receiving condition when transmitter 1 is quiescent stub line 41 and tank 43 act to provide an efficient coupling of the receiver to the line 40.

Details of a suitable circuit are shown in Fig. 3 of a system employing separate transmitting and receiving antennas 2 and 4. The transmitter 1 as shown comprises two triodes 14, 15, with plate line section 16 and grid line section 17. The filaments are energized through lines 18. Plate power is supplied to the plate tank through choke 19. Antenna 2 is fed from a line inductively coupled to plate tank 16.

The transmitter operates according to the principles of an oscillator disclosed in my application Serial No. 223,503, filed August 6, 1938, for Oscillation Generator and employs a periodically blocking grid circuit for obtaining high frequency pulse generation. This function is obtained through the use of parallel resistance-capacity components having a high time constant approximating the period of the pulse frequency. These elements are shown at 20 and 21. The transmitter accordingly blocks by grid current charging condenser 21 to cut off, and inaugurates a new cycle when this charge leaks off sufficiently across resistor 20 to permit oscillation.

The transmitter pulse is modulated by the continuously running oscillator 3 which is coupled to a tuned circuit in the grid lead comprising coil 22 and capacity 23. Oscillator 3 is similar to the transmitter and operates at high frequency although considerably lower than the transmitter. It includes triodes 24 and 25, plate tank 26 fed through choke 27, grid tank 28, and filament lines 29. Bias is obtained across resistor 30 and capacity 31 in the grid circuit. The oscillator is coupled to the transmitter by loop 32 inductively coupled to the plate tank 26 and by coil 33 fed thereby.

The returned wave is received by antenna 4 and fed to a receiver 34, which may include frequency converter and I. F. amplifier similar to that disclosed in application Serial No. 223,502, filed August 6, 1938, for Radio Ranging System. It will be understood however, that any pulse receiver of suitable design now well known to the art may be used if desired. For instance, the video portion of any suitable television receiver may well be employed such as that shown on page 547 of the text by Zworykin and Morton entitled "Television" published by John Wiley and Sons, Inc., copyright 1940. After demodulation the frequency of oscillator 3 as changed by the Doppler effect is mixed in tube 35 with the signal injected directly from oscillator 3, the mixer being coupled to the oscillator by coil 36. The output of the mixer tube includes both original frequencies and the transmitter pulse frequency as well as the desired Doppler difference frequency. In order to eliminate all but the latter, a band pass filter 37 is employed before the signal is fed to the frequency meter 8. In case the pulse frequency is above the range of difference frequencies, naturally a low pass filter would be employed, and it is further apparent that the necessary frequency discrimination could be incorporated in the frequency meter itself by suitable choice of components thereof.

Whereas a variety of frequency indicating devices may be used, that disclosed in Proceedings of the I. R. E., vol. 19, pp. 659 and 1506 is specifically applicable to the present system.

Although I have shown and described certain and specific embodiments of this invention, I am fully aware of the many modifications possible thereof. This invention is not to be restricted except insofar as is necessitated by the spirit of the appended claims.

The invention described herein may be manufactured and used by or for the Government of the United States of America for governmental purposes without the payment of any royalties thereon or therefor.

I claim:

1. In a velocity indicating system, a continuously running radio frequency oscillator, a much higher radio frequency impulse transmitter, adapted to emit regular recurrent impulses of a few microseconds' duration or less coupled to said oscillator and modulated thereby for transmitting amplitude modulated radio frequency wave impulses, and means for receiving said wave impulses upon return thereof and determining the Doppler frequency shift of the modulating signal.

2. In a velocity indicating system, a high radio frequency impulse transmitter adapted to emit regular recurrent impulses of a few microseconds' duration or less, a continuously running comparatively lower radio frequency oscillator coupled to and modulating the transmitter, means for receiving said wave impulses upon return thereof, and means coupling the oscillator to the receiving means whereby the Doppler frequency shift of the modulating signal may be determined when the transmitter is inoperative.

3. In a radio echo type velocity indicating system, a high radio frequency impulse transmitter including a self blocking power oscillator, a constantly running comparatively low radio frequency oscillator modulating the transmitter to effect generation of a modulated high frequency impulse by the transmitter, and means for receiving said wave impulses after reflection thereof from a remote object and determining the Doppler frequency shift of the modulating frequency.

4. In a radio echo type velocity indicating system, an intermittently operative high radio frequency transmitter, a continuously running comparatively low radio frequency oscillator coupled to said transmitter and operative to amplitude modulate the impulse wave therefrom, a receiver adapted to receive the transmitter impulse wave after reflection thereof from a remote object, said receiver being directly coupled to the oscillator and operative to supply a signal equal to the Doppler frequency shift of the modulating signal, an antenna, and switching means for coupling the antenna to the transmitter during impulse generation, and to the receiver during quiescent periods of the transmitter.

ROBERT M. PAGE.

REFERENCES CITED

The following references are of record in the file of this patent:

UNITED STATES PATENTS

| Number | Name | Date |
|---|---|---|
| 1,750,668 | Green | Mar. 18, 1930 |
| 1,945,952 | Nicolson | Feb. 6, 1934 |
| 2,401,717 | Wolff et al. | June 4, 1946 |
| 2,407,000 | Evans | Sept. 3, 1946 |
| 2,422,382 | Winchel | June 17, 1947 |
| 2,424,263 | Woodyard | July 22, 1947 |